(12) United States Patent
Sun et al.

(10) Patent No.: US 7,359,205 B1
(45) Date of Patent: Apr. 15, 2008

(54) BOTTOM EXIT OF EXHAUST AIR FROM A CHASSIS TO REDUCE ACOUSTICS EMISSION

(75) Inventors: Xiaohua H. Sun, Cupertino, CA (US); Don Le, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/270,997

(22) Filed: Nov. 9, 2005

(51) Int. Cl.
*H05K 7/20* (2006.01)
*F28F 7/00* (2006.01)

(52) U.S. Cl. ............... 361/719; 361/694; 361/695; 165/80.2

(58) Field of Classification Search ............ 361/683, 361/681, 686–690, 692, 694, 695, 704, 714, 361/715, 717–721, 724–727, 752, 736; 174/50.54, 174/50.5, 50.51, 52.1, 16.1, 16.3; 257/685, 257/686, 712, 717; 312/223.2, 223.3, 236; 454/184; 165/80.3, 80.2
See application file for complete search history.

(56) References Cited

U.S. PATENT DOCUMENTS

| | | | | |
|---|---|---|---|---|
| 3,903,404 A | * | 9/1975 | Beall et al. ............... | 361/687 |
| 4,027,206 A | * | 5/1977 | Lee ....................... | 361/697 |
| 4,237,521 A | * | 12/1980 | Denker .................... | 361/697 |
| 5,615,085 A | * | 3/1997 | Wakabayashi et al. ...... | 361/702 |
| 5,694,294 A | * | 12/1997 | Ohashi et al. ............ | 361/687 |
| 5,796,580 A | * | 8/1998 | Komatsu et al. ........... | 361/687 |
| 6,094,347 A | * | 7/2000 | Bhatia .................... | 361/695 |
| 6,215,657 B1 | * | 4/2001 | Bhatia .................... | 361/687 |
| 6,350,033 B1 | * | 2/2002 | Fujimori .................. | 353/61 |
| 6,487,074 B1 | * | 11/2002 | Kimura et al. ............ | 361/695 |
| 6,599,090 B2 | * | 7/2003 | Ozaki et al. .............. | 415/206 |
| 6,657,680 B2 | * | 12/2003 | Takizawa .................. | 349/5 |
| 6,744,629 B2 | * | 6/2004 | Hidesawa ................. | 361/687 |
| 6,866,389 B2 | * | 3/2005 | Ito et al. ................ | 353/119 |
| 6,966,655 B2 | * | 11/2005 | Hara et al. ............... | 353/61 |

* cited by examiner

*Primary Examiner*—Lisa Lea-Edmonds
*Assistant Examiner*—Anthony M Haughton (57) ABSTRACT

Embodiments of the present invention recite an electronic device comprising a chassis, a backplane, at least one heat generating component coupled with the backplane, and a fan. In embodiments of the present invention, the chassis comprises at least one air inlet disposed on a side of the chassis and at least one exhaust outlet disposed on the bottom surface of the chassis. The heat generating component is suspended from said backplane when coupled therewith and is disposed above the at least one exhaust outlet. The fan draws cooling air through the at least one air inlet and expels the cooling air through the at least one exhaust outlet.

20 Claims, 8 Drawing Sheets

BOTTOM EXIT OF EXHAUST AIR FROM A CHASSIS TO REDUCE ACOUSTICS EMISSION

FIELD OF THE INVENTION

Embodiments of the present invention relate to the field of cooling devices for an electronics system.

BACKGROUND OF THE INVENTION

Electronic equipment often require extra cooling to transfer and dissipate the heat generated by the various components such as microprocessors, integrated circuits, etc. and the most commonly used mechanism for removing heat from a product such as a computer or server is a motor-driven fan in conjunction with a heatsink.

Figure 1:
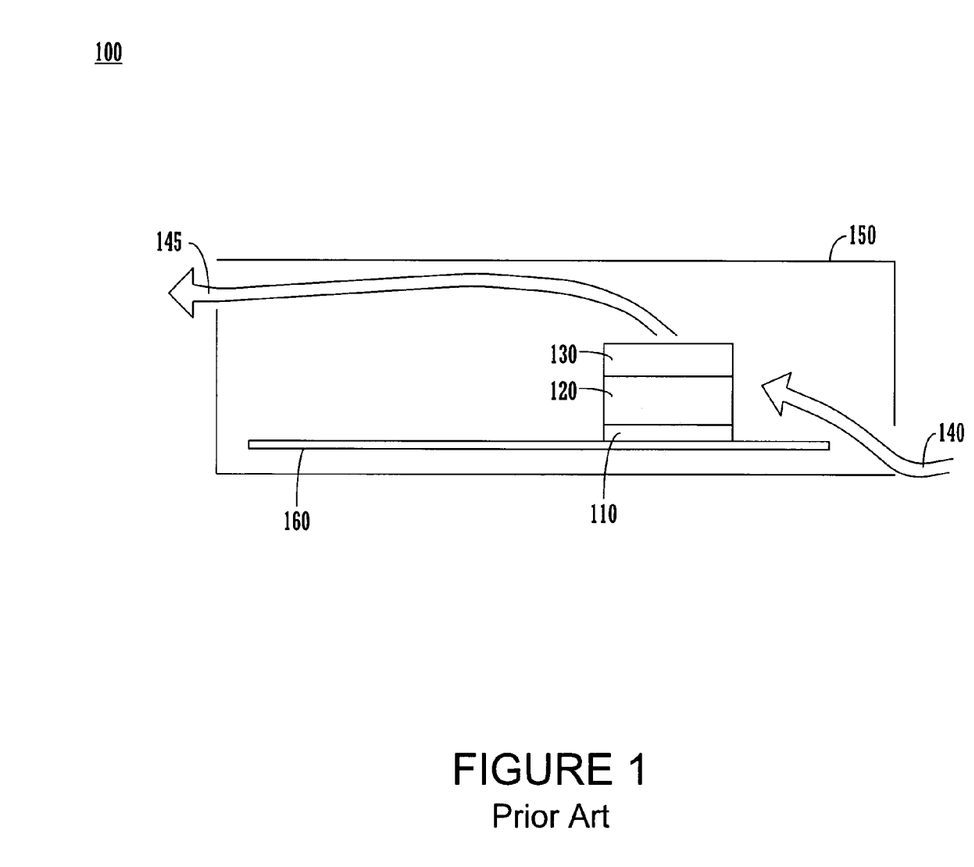
FIG. 1 is a diagram of an exemplary prior art computer system.

FIG. 1 is a front view of an exemplary housed computer system 100 showing how heat is typically removed. Typically, heat generated by semiconductor device 110 is transferred via conduction to a heatsink 120 comprising a plurality of fins (not shown) that in turn dissipate the heat via convection. A fan 130 mounted on the heatsink 120 draws ambient air, depicted by arrow 140, into itself. The outflow air, depicted by arrow 145, from fan 130 generates forced air convection at the heatsink fins, thus conveying the heat away from heatsink 120. As shown in FIG. 1, the ambient air is drawn through the front of a housing or chassis 150 and is exhausted from the rear of the chassis. Alternatively, the ambient air may be drawn from the sides or exhausted from the top of chassis 150. It is noted that FIG. 1 shows a desktop computer system in which the motherboard 160 is disposed at the bottom of chassis 150. This is regarded as advantageous in many situations because heat convection can be leveraged as an aid in removing heat from semiconductor device 110. In so called "tower" designs, motherboard 160 is mounted upright on one side of chassis 150, thus resulting in a horizontal configuration of semiconductor device 110, heatsink 120 and fan 130.

Because of the heat being conveyed by outflow air 145, it is not desirable to vent the exhausted air out of the front, top, or sides of chassis 150 where it may also be directed at a user of computer system 100. Additionally, noise generated by fan 130 can be problematic when outflow air 145 is vented from the top or sides of chassis 150. Finally, outflow air 145 may become blocked by an object placed on top of, or the side of, chassis 150 thus causing a heat induced failure of one or more components of computer system 100.

Many newer computer systems use greater amounts of power than earlier systems, thus resulting in more heat being generated. As a result, the volume of outflow air from these newer computer systems must be increased to prevent heat induced failure of their components, thereby increasing the amount of unwanted noise generated by these computer systems.

SUMMARY OF THE INVENTION

Embodiments of the present invention recite an electronic device comprising a chassis, a backplane, at least one heat generating component coupled with the backplane, and a fan. In embodiments of the present invention, the chassis comprises at least one air inlet disposed on a side of the chassis and at least one exhaust outlet disposed on the bottom surface of the chassis. The heat generating component is suspended from said backplane when coupled therewith and is disposed above the at least one exhaust outlet. The fan draws cooling air through the at least one air inlet and expels the cooling air through the at least one exhaust outlet. This air flow route leads to a reduction in noise emission from the air movers when compared to placing the air movers close to the top of the chassis.

In one embodiment, hot exhaust can be exhausted from the bottom of the chassis using the space provided by the bottom stand-offs of the chassis. The heat generating component may be a computer motherboard that contains one or more processors (e.g., a CPU and/or a GPU).

Embodiments of the present invention are advantageous over conventional systems because, by venting cooling air through the bottom of chassis, acoustic emissions perceived by a user can be moderated. This is, in part, due to the fact that a large portion of the mass of the electronic device is between the major source of acoustic emissions and the user. More specifically, noise from the exhaust outlet is typically the greatest source of noise from, for example, a computer system. Typically, this noise is a combination of sound generated by a cooling fan, power supply, as well as noise of cooling air exiting an exhaust outlet. For some users, this noise can be unpleasantly loud and distracting. Because the exhaust outlets of the present invention are disposed on the bottom surface of the chassis, the noise which might otherwise be directed toward a user is instead directed into the supporting surface. As the sound waves are reflected between the supporting surface and the bottom surface of the chassis, the noise level is moderated such that, when the noise finally reaches a user, its volume is greatly reduced.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 2:
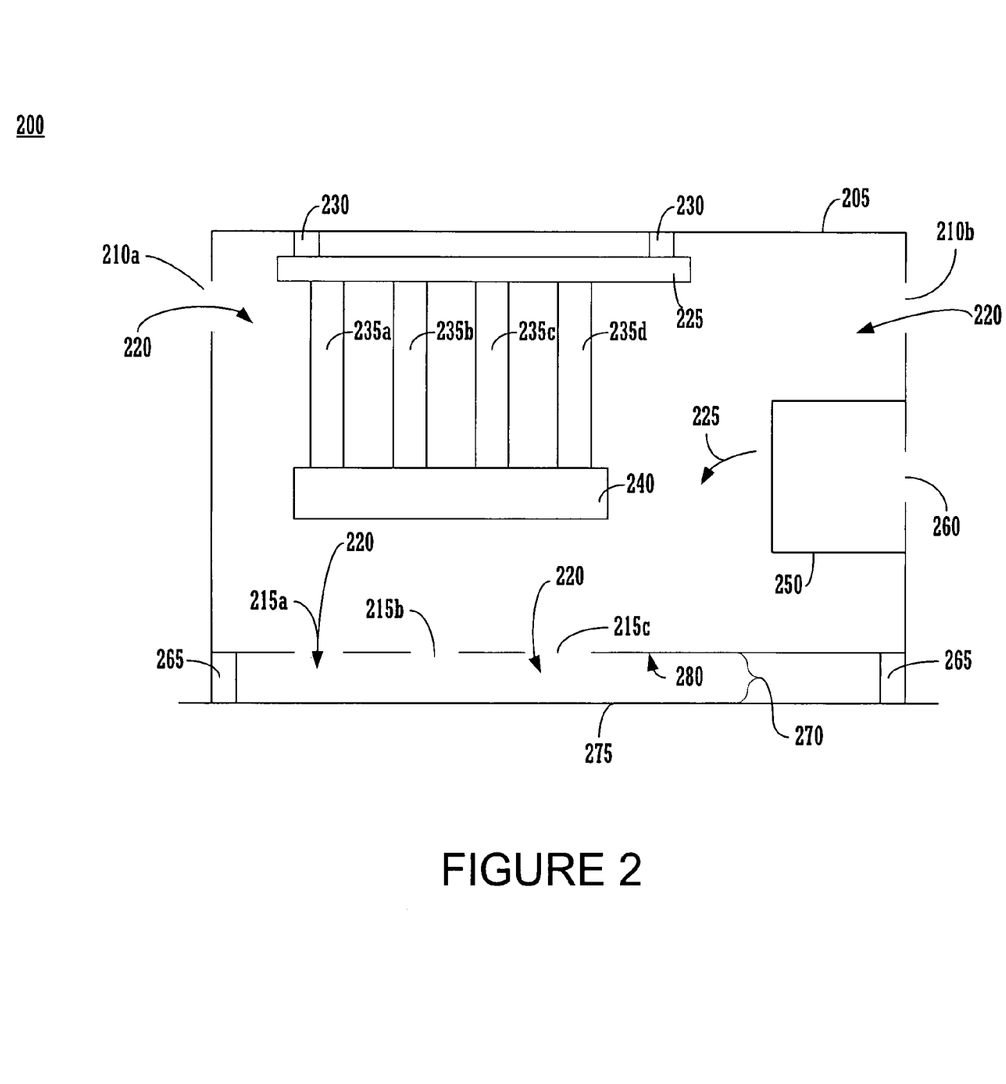
FIG. 2 is a section view of an exemplary electronic system with bottom exhaust in accordance with embodiments of the present invention.

FIG. 2 is a section view of an exemplary electronic system 200 in accordance with embodiments of the present invention. In FIG. 2, system 200 comprises a chassis 205 which has at least one side air vent (e.g., 210a and 210b) and with at least one exhaust outlet (e.g., 215a, 215b, and 215c) disposed on the bottom surface (e.g., 280) of chassis 205. Also shown in FIG. 2 is a backplane 225 that is coupled with chassis 205 using mechanical coupling 230. In embodiments of the present invention, mechanical coupling 230 may comprise a screw or other fastener. In embodiments of the present invention, mechanical coupling 230 may also be used to conduct heat from backplane 225 to chassis 205. Furthermore, in embodiments of the present invention, a heat conductor such as a heatsink, a heatpipe, or another device, may be used to thermally couple backplane 225 with chassis 205 to facilitate heat dissipation.

In embodiments of the present invention, backplane 225 comprises an integrated circuit board (e.g., motherboard or other circuit board) to which at least one heat generating component (e.g., heat generating components 235a, 235b, 235c, and 235d) is coupled. As shown in FIG. 2, heat generating components 235a-235d are suspended from backplane 225. Furthermore, when coupled with backplane 225, heat generating components 235a-235c are disposed above exhaust outlets 215a-215c. A fan (e.g., 240) is utilized to draw cooling air (typically shown as arrows 220) through at least one of the side air inlets 210a and 210b and to expel the cooling air through the at least one of the exhaust outlets 215a-215c due to a pressure gradient created by fan 240. Due to the pressure gradient created by fan 240, some of cooling air 220 passes over and around heat generating devices 235a-235d and dissipates some of the heat radiated by the heat generating devices 235a-235d. After being expelled from fan 240, cooling air 220 exits chassis 205 via exhaust outlets 215a-215c, thus conveying heat generated by heat generating device 235a-235d out of chassis 205. It is noted that while the embodiment of FIG. 2 shows fan 240 being disposed proximate to heat generating components 235a-235d, fan 240 may be disposed in other locations within chassis 205 in other embodiments of the present invention.

In embodiments of the present invention, system 200 may comprise a discrete graphics processing system. Thus, in embodiments of the present invention, backplane 225 is an integrated circuit board comprising a graphics processing unit (GPU) output multiplexer (not shown) and a controller unit (not shown), comprising a frame synchronization master and respective clock control units, which are coupled to the GPUs (e.g., heat generating components 235a-235d). The multiple GPUs of discrete graphics processing system 200 can be used to implement the cooperative GPU execution processes for rendering an image. It should be noted that although embodiments of the present invention are specifically directed toward a discrete graphics processing system, the configuration for reducing acoustic emission shown in FIG. 2 may be implemented in a variety of other electronic devices in accordance with embodiments of the present invention.

As shown in FIG. 2, system 200 further comprises a power supply 250 through which power supply air 255 passes. In embodiments of the present invention, power supply air 255 also enters chassis 205 via a side air inlet (e.g., 260) and also exits chassis 205 via at least one of the exhaust outlets 215a-215c. It is noted that, while not shown in FIG. 2, in embodiments of the present invention, exhaust outlets may be disposed around the entire periphery of the bottom surface 280 of chassis 205, across the entirety of bottom surface 280, or some combination thereof.

In embodiments of the present invention, system 200 further comprises at least one spacer (e.g., 265) or stand-off for maintaining a gap (e.g., 270) below at least one of the exhaust outlets on the bottom surface of chassis 205. As will be discussed in greater detail below, spacer 265 may comprise one or more legs, brackets, or other features which maintains gap 270 between the bottom surface 280 of chassis 205 and a supporting surface (e.g., 275 of system 200. In so doing, an air circulation path for cooling air 220 is maintained, thus facilitating the removal of heat from chassis 205.

Embodiments of the present invention are advantageous over conventional systems because, by venting cooling air 220 through the bottom of chassis 205 (e.g., via exhaust outlets 215a-215c) acoustic emissions perceived by a user of system 200 can be moderated. This is, in part, due to the fact that a large portion of the mass of system 200 is between the major source of acoustic emissions and the user. More specifically, noise from the exhaust outlet is typically the greatest source of noise from, for example, a computer system. Typically, this noise is a combination of sound generated by a cooling fan, power supply, as well as noise of cooling air exiting an exhaust outlet. For some users, this noise can be unpleasantly loud and distracting. Because exhaust outlets 215a-215c are disposed on the bottom surface 280 of chassis 205, the noise which might otherwise be directed toward a user is instead directed into supporting surface 275. As the sound waves are reflected between supporting surface 275 and the bottom surface 280 of chassis 205, the noise level is moderated such that, when the noise finally reaches a user of system 200, its volume is greatly reduced.

This is especially important when system 200 is implemented as a discrete graphics processing system. Currently, there are power constraints imposed upon devices such as graphics processing cards that are coupled with the motherboard of a computer system. This is largely due to the industry standard specifications which have been adopted for motherboards by leading industry manufacturers. For example, the ATX form factor refers to the widely used industry standard motherboard form factor supported by, CPU manufacturers, chipset manufacturers, motherboard manufacturers, and the like.

The ATX form factor typically allows a limited amount of space for a card-based GPU. A typical card-based GPU connects to the motherboard via an AGP slot. The AGP slot has a limited amount of space for the components of the card-based GPU. The limited amount of space directly impacts the efficiency of the thermal protection components of the card-based GPU. Additionally, as card-based GPUs have increased in performance, the available power (e.g., the specified voltages and currents) of the AGP connection has become increasingly insufficient.

The BTX form factor refers to a more recent industry standard motherboard form factor. The BTX form factor is generally considered the next generation ATX follow on specification for a "desktop" PC chassis and, as with the earlier ATX form factor, is widely supported by the leading industry manufacturers. Unfortunately, the BTX form factor presents even more problems with respect to high-performance GPU subsystems.

The BTX form factor is problematic in that the BTX design rules place a number of constraints on the form and performance of the GPU subsystem. For example, BTX design rules locate the desktop computer system's CPU at the front entry point for cooling airflow, while positioning the GPU subsystem (e.g., graphics card) in its downstream airflow and adding restrictions on the GPU subsystem's physical dimensions (e.g., x-y-z size), available air flow, available thermal dissipation, and power delivery.

Similar constraints are in place for laptop computer system form factors. For example, the future evolution of GPU subsystems for laptop computers is constrained by the fact that the laptop chassis (e.g., motherboard platform, case, airflow, etc.) is optimized for the requirements of CPUs and their associated chipsets. This optimization limits the available thermal dissipation budget, power delivery, and physical dimensions (e.g., x-y-z size) for any graphics subsystem implementation.

Additionally, in conventional computer systems, it is considered "normal" to mount the motherboard toward the bottom of the chassis (e.g., in a desktop system), or toward one side (e.g., in a tower system) both in order to allow heat to rise away from heat generating components as well as to facilitate peripheral devices such as sound cards, graphics processing units, etc.

Thus, a graphics processing system as shown in FIG. 2 is advantageous in that the form factor constraints, data transfer bandwidth, and power limitations described above which limit the upward scalability of a GPU subsystem are substantially eliminated by using a discrete graphics processing system as described above. One result of this is that larger power supplies can be used with system 200 than are currently used with home or laptop computer systems. Consequently, a greater amount of acoustic emission may be exhibited by a discrete graphics processing system such as system 200. However, by emitting cooling air 220 through the bottom surface 280 of chassis 205, embodiments of the present invention can significantly reduce amount of noise perceived by a user of system 200. Again, it is noted that embodiments of the present invention are not limited to graphics processing systems alone and may be implemented to, for example, reduce the acoustic emissions from a stand alone computer system as well.

Furthermore, embodiments of the present invention reduce the chance of accidentally blocking the flow of cooling air 220 as it exits chassis 205. As described above, exhaust outlets can inadvertently become blocked by, for example, a book or papers placed on top of the exhaust outlet. However, by disposing exhaust outlets 215a-215c on the bottom surface 280 of chassis 205, embodiments of the present invention reduce the likelihood of this happening.

Figure 3A:
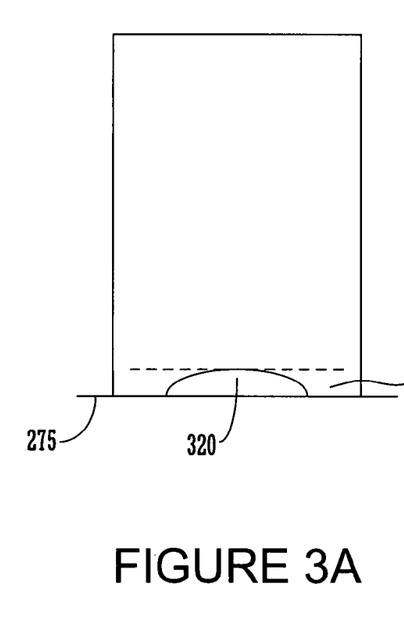
FIGS. 3A and 3B are front and side views of an exemplary chassis used in accordance with another embodiments of the present invention.
Figure 3B:
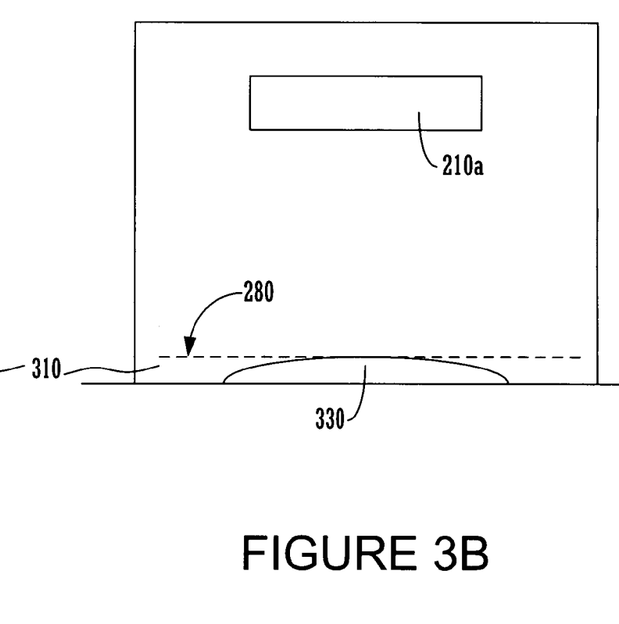

FIGS. 3A and 3B are front and side views of an exemplary chassis used in accordance with another embodiments of the present invention. In the embodiment of FIGS. 3A and 3B, portions of the sides of chassis 205 extend below the bottom surface 280 of chassis 205 to form legs (e.g., 310), thus maintaining gap 270 between chassis 205 and supporting surface 275. Furthermore, portions of the sides of chassis 205 form curved openings (e.g., 320 and 330) which permit cooling air 220 to exit after being expelled from chassis 205.

Figure 4A:
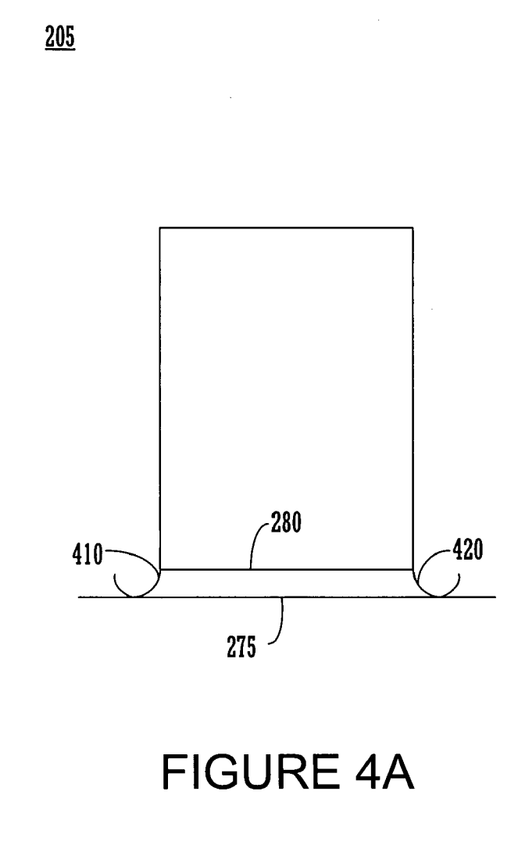
FIGS. 4A and 4B are front and side views of an exemplary chassis used in accordance with another embodiments of the present invention.
Figure 4B:
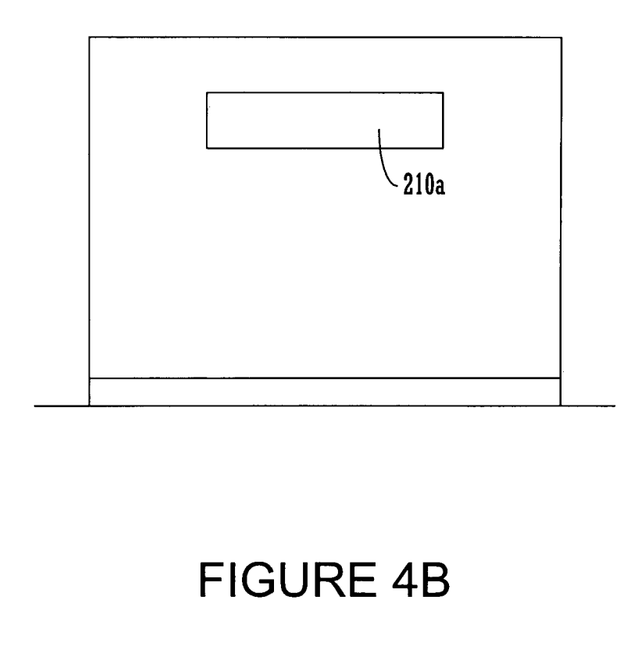

FIGS. 4A and 4B are front and side views of an exemplary chassis used in accordance with another embodiments of the present invention. In the embodiment of FIGS. 4A and 4B, the sides of chassis 205 (e.g., 410 and 420) extend all the way down to supporting surface 275 while maintaining gap 270 below chassis 205. However, chassis 205 does not extend any further than bottom surface 280, thus creating openings at the front and rear of system 200 through which cooling air 220 can gap 270. It is noted that either the front or rear of chassis 205 may also be extended down to supporting surface 275 in embodiments of the present invention, thus leaving only one opening for cooling air 220 to exit from gap 270.

Figure 5A:
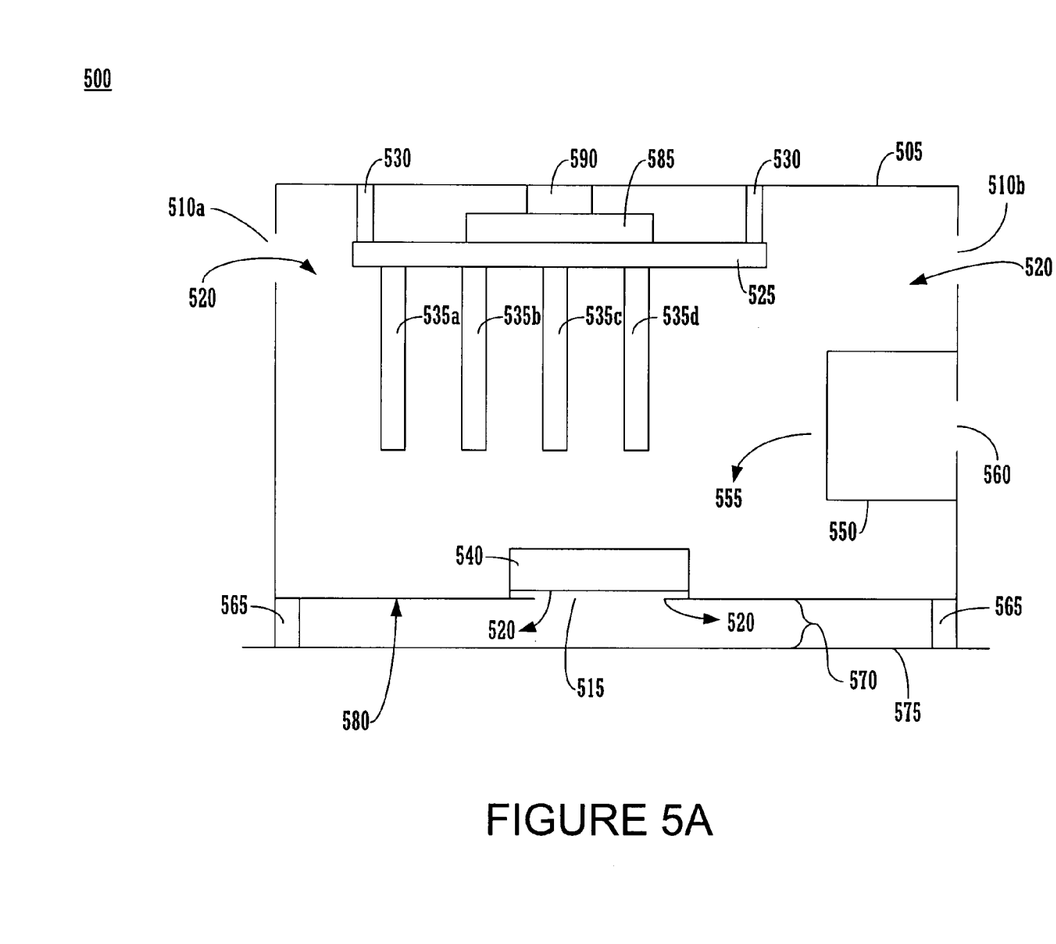
FIG. 5A is a section view of an exemplary electronic system with bottom exhaust in accordance with another embodiment of the present invention.

FIG. 5A is a section view of an exemplary electronic system in accordance with another embodiment of the present invention. In FIG. 5A, system 500 comprises a chassis 505 which has at least one side air vent (e.g., 510a and 510b) and with at least one exhaust outlet (e.g., 515) disposed on the bottom surface (e.g., 580) of chassis 505. Also shown in FIG. 5A is a backplane 525 that is coupled with chassis 505 using mechanical coupling 530. In embodiments of the present invention, mechanical coupling 530 may comprise a screw or other fastener. In embodiments of the present invention, mechanical coupling 530 may also be used to conduct heat from backplane 525 to chassis 505. Furthermore, in embodiments of the present invention, a heat conductor such as a heatsink, a heatpipe, or another device, may be used to thermally couple backplane 525 with chassis 505 to facilitate heat dissipation.

In embodiments of the present invention, backplane 525 comprises an integrated circuit board to which at least one heat generating component (e.g., heat generating components 535a, 535b, 535c, and 535d) is coupled. As shown in FIG. 5A, heat generating components 535a-535d are suspended from backplane 525. A fan (e.g., 540) is utilized to draw cooling air (typically shown as arrows 520) through at least one of the side air inlets 510a and 510b and to expel the cooling air through exhaust outlet 515 due to a pressure gradient created by fan 540. Due to the pressure gradient created by fan 540, some of cooling air 520 passes over and around heat generating devices 535a-535d and dissipates heat radiated by the heat generating devices 535a-535d. After being expelled from fan 540, cooling air 520 exits chassis 505 via exhaust outlet 515, thus conveying heat generated by heat generating device 535a-535d out of chassis 505.

As shown in FIG. 5A, system 500 further comprises a power supply 550 through which power supply air 555 passes. In embodiments of the present invention, power supply air 555 also enters chassis 505 via a side air inlet (e.g., 560) and also exits chassis 505 via exhaust outlet 515. It is noted that, while not shown in FIG. 5A, in embodiments of the present invention, exhaust outlets may be disposed around the entire periphery of the bottom surface 580 of chassis 505, across the entirety of bottom surface 580, or some combination thereof.

In embodiments of the present invention, system 500 further comprises at least one spacer (e.g., 565) for maintaining a gap (e.g., 570) below at least one of the exhaust outlet on the bottom surface of chassis 505. As will be discussed in greater detail below, spacer 565 may comprise one or more legs, brackets, or other features which maintains gap 570 between the bottom surface 580 of chassis 505 and a supporting surface (e.g., 575 of system 500. In so doing, an air circulation path for cooling air 520 is maintained, thus facilitating the removal of heat from chassis 505.

In the embodiment of FIG. 5A, system 500 further comprises a processor 585 for processing digital information and instructions and a heat conducting device 590 for conducting heat away from processor 585. In embodiments of the present invention, heat conducting device 590 may comprise a heatsink, a heatpipe, or another device which conveys heat generated by processor 585 to chassis 505. It is noted that in embodiments of the present invention, processor 585 is disposed on the opposite side of backplane 525 from expansion units (e.g., heat generating components 535a-535d) such as graphics processing units, audio processing units, communication units, etc. Furthermore, while the embodiment of FIG. 5A specifically teaches a processor 585, in embodiments of the present invention another heat generating device may be disposed on the opposite side of backplane 525 from heat generating components 535a-535d.

Figure 5B:
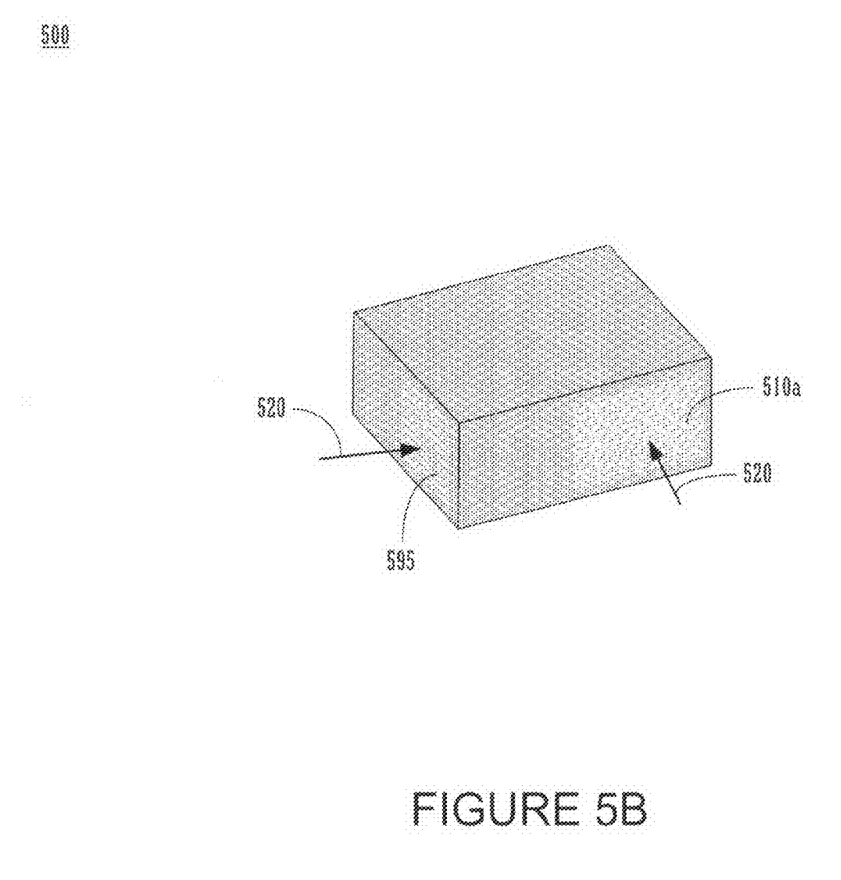
FIG. 5B is a side perspective view of an exemplary electronic system with bottom exhaust in accordance with embodiments of the present invention.

FIG. 5B is a side perspective view of an exemplary electronic system 500 with bottom exhaust in accordance with embodiments of the present invention. As shown in FIG. 5B, cooling air enters chassis 505 via side air inlet 510a. As shown in FIG. 5B, in embodiments of the present invention, chassis 505 may further comprise a rear air inlet (e.g., 595) through which cooling air 520 may enter.

Figure 5C:
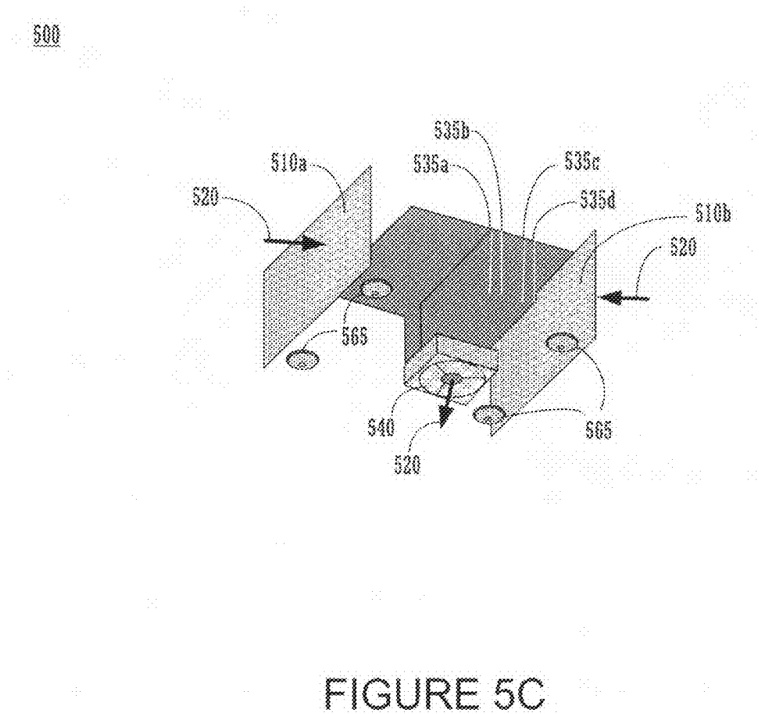
FIG. 5C is a bottom perspective view of components of an exemplary electronic system with bottom exhaust in accordance with embodiments of the present invention.

FIG. 5C is a bottom perspective view of components of an exemplary electronic system with bottom exhaust in accordance with embodiments of the present invention. As shown in FIG. 5C, cooling air 520 enters chassis 505 via side air inlets 510a and 510b. As it passes around heat generating components 535a-535d, it conveys the heat away due to the pressure gradient caused by fan 540 which is expelling cooling air via exhaust outlet 515 (not shown).

Figure 6:
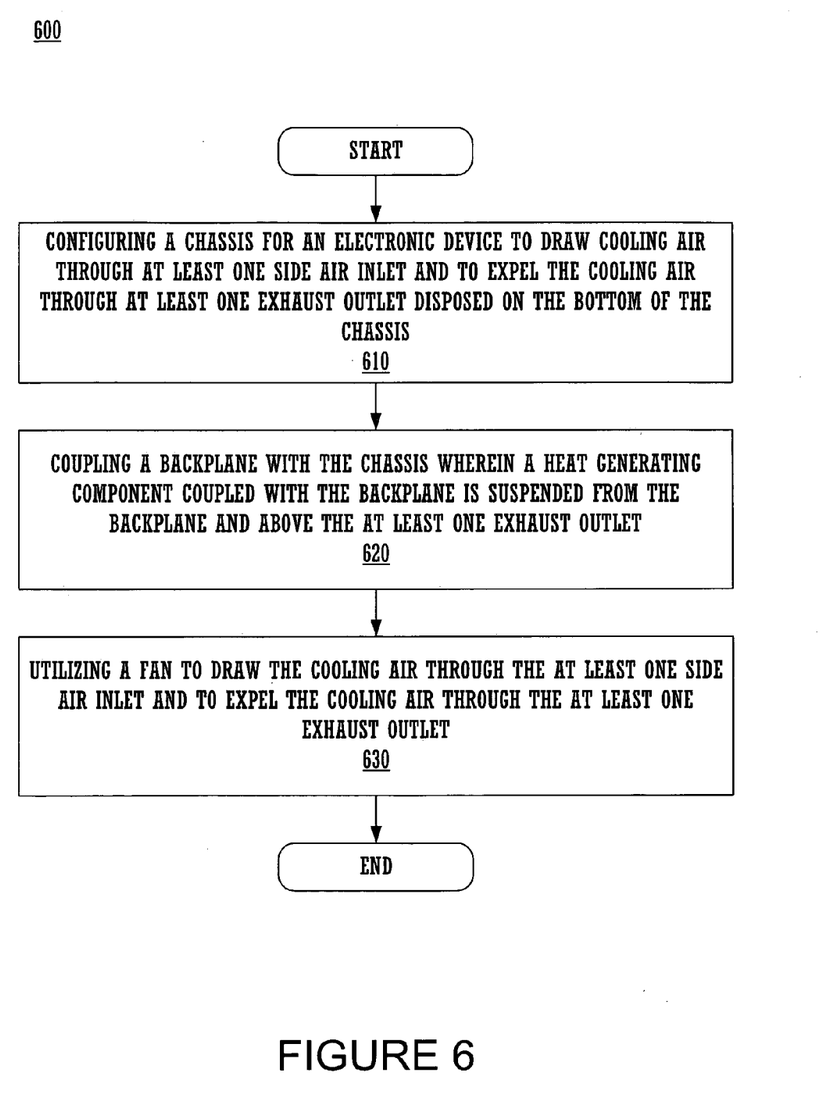
FIG. 6 is a flowchart of a method for reducing acoustic emission from an electronic device in accordance with embodiments of the present invention.

FIG. 6 is a flowchart 600 of a method for reducing acoustic emission from an electronic device in accordance with embodiments of the present invention. In step 610 of FIG. 6, a chassis for an electronic device is configured to draw cooling air through at least one side air inlet and to expel the cooling air through at least one exhaust outlet disposed on the bottom of the chassis. As described above with reference to FIGS. 2 and 5A, in embodiments of the present invention, a chassis (e.g., 205 of FIG. 2) is configured with at least one side air inlet (e.g., 210a and 210b) and with at least one exhaust outlet (e.g., 215a, 215b, and 215c) disposed on the bottom of the chassis 205.

In step 620 of FIG. 6, a backplane is coupled with the chassis wherein a heat generating component coupled with the backplane is suspended from the backplane and above the at least one exhaust outlet. With reference again to FIG. 2, a backplane 225 is coupled with chassis 205 using mechanical coupling 230. In embodiments of the present invention, mechanical coupling 230 may comprise a screw or other fastener. In embodiments of the present invention, mechanical coupling 230 may also be used to conduct heat from backplane 225 to chassis 205. In FIG. 2, heat generating components 235a-235d are suspended from backplane 225. Furthermore, when coupled with backplane 225, heat generating components 235a-235c are disposed above exhaust outlets 215a-215c.

In step 630 of FIG., 6, a fan is utilized to draw cooling air through the at least one side air inlet and to expel the cooling air through the at least one exhaust outlet. As shown in FIG. 2, during operation of system 200, cooling air 220 is drawn into chassis 205 via side air inlets 210a and 210b due to a pressure gradient created by fan 240. Due to the pressure gradient created by fan 240, some of cooling air 225 passes over and around heat generating devices 225a-225d and remove heat radiated therefrom via convection. After being expelled from fan 240, cooling air 225 is compelled in the general direction of exhaust outlets 215a-215c, thus removing heat from chassis 205 as it exits.

Because cooling air is expelled out of the bottom surface of the chassis, embodiments of the present invention reduce the perceptible acoustic emissions of system 200 and/or 500. Furthermore, embodiments of the present invention reduce the likelihood of a user inadvertently blocking the exit path of cooling air from the chassis, thus increasing the reliability of systems 200 and 500.

The preferred embodiment of the present invention, bottom exit of exhaust air form a chassis to reduce acoustics emission, is thus described. While the present invention has been described in particular embodiments, it should be appreciated that the present invention should not be construed as limited by such embodiments, but rather construed according to the following claims.

What is claimed is:

1. An electronic system comprising:
    a chassis comprising at least one air inlet disposed on a side of said chassis and at least one exhaust outlet disposed on the bottom surface of said chassis;
    a backplane disposed at a top surface of said chassis;
    at least one heat generating component coupled with said backplane wherein said at least one heat generating component is suspended from said backplane and above said at least one exhaust outlet, and wherein said suspending orients said at least one heat generating component to expose a larger surface area of said at least one heat generating component to airflow in comparison to the portion coupled to said backplane; and
    a fan for drawing cooling air through said at least one air inlet and for expelling the cooling air through said at least one exhaust outlet.

2. The electronic system of claim 1 further comprising:
    at least one spacer for maintaining a gap below said at least one exhaust outlet.

3. The electronic system of claim 1 further comprising:
    a power supply and wherein cooling air passing through said power supply is expelled through said at least one exhaust outlet.

4. The electronic system of claim 1 further comprising:
    a thermal coupling for conducting heat from said backplane to said chassis.

5. The electronic system of claim 4 wherein said thermal coupling comprises a component for mechanically coupling said backplane with said chassis.

6. The electronic system of claim 1 further comprising:
    a processor disposed on top of said backplane; and
    a thermal coupling for conducting heat from said processor to said chassis.

7. The electronic system of claim 1 wherein said at least one heat generating component comprises a graphics processing unit and wherein said electronics system comprises a discrete graphics processing system.

8. A method for reducing acoustic emission from an electronic device, said method comprising:
    configuring a chassis for said electronic device to draw cooling air through at least one side air inlet and to expel said cooling air through at least one exhaust outlet disposed on the bottom surface of said chassis;
    coupling a backplane at a top surface of said chassis wherein a heat generating component coupled with said backplane is suspended from said backplane and above said at least one exhaust outlet, and wherein said suspending orients said heat generating component to expose a larger surface area of said heat generating component to airflow comparison to the portion coupled to said backplane; and utilizing a fan to draw said cooling air through said at least one side air inlet and to expel said cooling air through said at least one exhaust outlet.

9. The method as recited in claim 8 further comprising: maintaining a gap below said at least one exhaust outlet.

10. The method as recited in claim 8 further comprising: expelling cooling air drawn passing through a power supply through said at least one exhaust outlet.

11. The method as recited in claim 8 further comprising: conducting heat from said backplane to said chassis via a heat conducting device.

12. The method as recited in claim 11 wherein said conducting further comprises:

using a mechanical coupling to conduct heat from said backplane to said chassis.

13. The method as recited in claim 8 wherein said electronic device further comprises a processor disposed on top of said backplane and wherein said method further comprises:

conducting heat from said processor to said chassis.

14. The method as recited in claim 8 wherein said at least one heat generating component comprises a graphics processing unit of a discrete graphics processing system and wherein said method further comprises:

expelling heat generated by said graphics processing unit through said at least one exhaust outlet.

15. A graphics processing system comprising:

a chassis comprising at least one air inlet disposed on a side of said chassis and at least one exhaust outlet disposed on the bottom surface of said chassis;

a backplane disposed at a top surface of said chassis;

at least one graphics processing unit coupled with said backplane wherein said at least one graphics processing unit is suspended from said backplane and above said at least one exhaust outlet, and wherein said suspending orients said at least one graphics processing unit to expose a larger surface area of said at least one graphics processing unit to airflow in comparison to the portion coupled to said backplane; and a fan drawing cooling air through said side of said chassis and for expelling the cooling air through said at least one exhaust outlet.

16. The graphics processing system of claim 15 further comprising:

at least one spacer for maintaining a gap below said at least one exhaust outlet.

17. The graphics processing system of claim 15 further comprising:

a power supply and wherein cooling air passing through said power supply is expelled through said at least one exhaust outlet.

18. The graphics processing system of claim 15 further comprising:

a heat conducting device for conducting heat from said backplane to said chassis.

19. The graphics processing system of claim 18 wherein heat conducting device comprises a coupling component for mechanically coupling said backplane with said chassis.

20. The graphics processing system of claim 15 further comprising:

a heat generating component disposed on top of said backplane; and a thermal coupling for conducting heat from said heat generating component to said chassis.

* * * * *